June 5, 1928.
G. H. RUHL
FARMER'S LAND LEVELER
Filed March 17, 1927
1,671,999
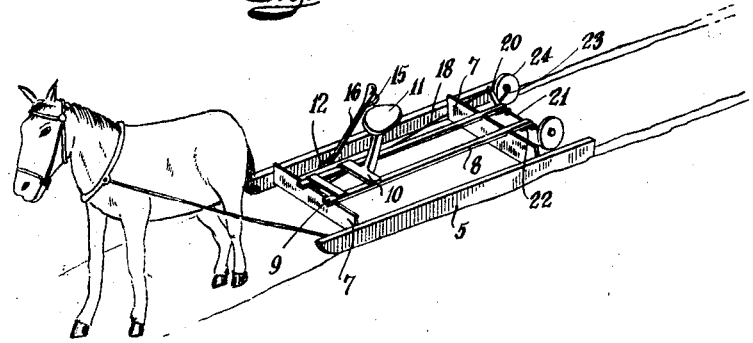
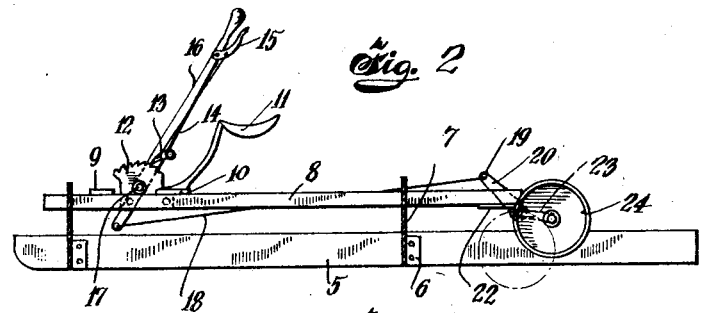
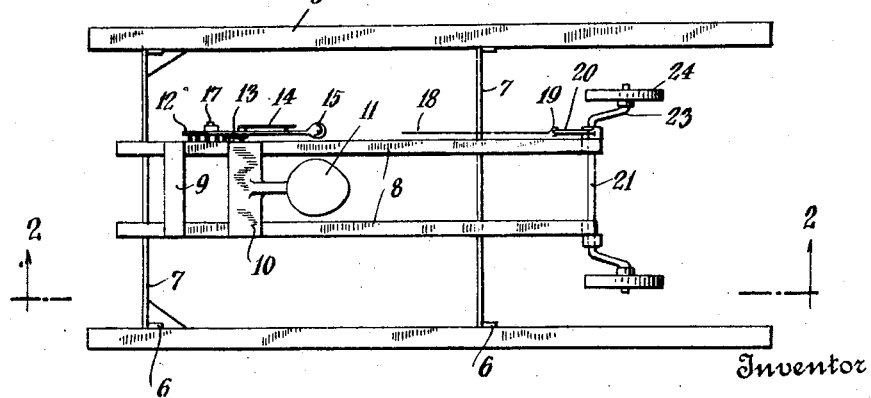
Inventor
Gottlieb H. Ruhl
By his Attorney Patented June 5, 1928.

1,671,999

UNITED STATES PATENT OFFICE.

GOTTLIEB H. RUHL, OF FORT MORGAN, COLORADO.

FARMER'S LAND LEVELER.

Application filed March 17, 1927. Serial No. 175,987.

This invention relates to agricultural implements and more particularly to machines used for leveling.

It is well known that smooth, evenly surfaced fields will produce more crops than bumpy, uneven soil, especially irrigated land.

Seed planted in leveled ground can be planted at just the right depth for proper growth, the crop then being full, thick and uniform.

With leveled land, the distribution of water is simple, easy and even. There are no high and dry knolls and no low and soggy sloughs, where part of the crop is dried out and the other part saturated.

In addition, a cultivator run over leveled ground breaks the soil evenly over the entire field, thus making it easier to drive straight rows.

Devices used heretofore, for the above purposes, have been found to be complicated, expensive and inefficient.

It is therefore an object of this invention to overcome the foregoing disadvantages by providing a leveling device that contains few and simple parts, can be manufactured at a low cost and which performs its functions in a positive manner, thus saving a great amount of heretofore needlessly wasted energy on the part of the operator.

These several major objects, together with numerous other objects, which will become apparent as the description progresses, are accomplished by the novel construction, combination and arrangement of parts, hereinafter described and illustrated in the accompanying drawing, forming an important component of this disclosure, and in which:—

Figure 1 is a general perspective view showing the device in use.

Figure 2 is a partial sectional view taken on line 2—2 of Figure 3.

Figure 3 is a top plan view of the device.

In the drawing, the numeral 5 designates a pair of spaced, parallel runners having their forward edges curved to present smooth running surfaces.

Intermediate the runners and connected to the inner sides of the same, by brackets 6, is a pair of spaced, transverse, rectangular leveling plates 7 provided with notches in their upper edges in which is secured longitudinal supports 8.

The supports 8 are connected by crosspieces 9 and 10, from the latter, of which rises a seat 11.

Fixed on one of the supports 8 just in advance of the cross-piece 10, is an arcuate rack 12 engaged by a pawl 13 connected by a rod 14 to a handle 15 pivoted to a lever 16, rotatably mounted, at 17, to the rack.

Pivoted to the lower end of the lever 16 is a rod 18 similarly connected, at 19, to a crank 20 fixed on an axle 21 journalled in brackets 22 secured on the rear ends of the supports 8, the axle having offset portions 23 at its ends, carrying wheels 24.

Thus, during normal operation, the lever 16 will be in its backward position so that the wheels 24 will be clear of the ground.

By drawing the device over the soil, as shown in Figure 1, the plates 7 will ride along the land, scraping the same and making it even and substantially level.

If the ground should be rather soggy and the going is hard, by moving the lever 16 forward, the wheels 24 will engage the earth, raising the rear end of the device, making the same easier to be drawn.

It will thus be noted that a leveling device has been disclosed comprised of relatively few and simple elements, which can be manufactured cheaply and which is positive and efficient in its operation.

While the foregoing is descriptive of the preferred embodiment of my invention, obviously, minor changes in construction, arrangement, sizes and proportions may be made without departing from the spirit or scope of the claims hereto appended.

Having thus described my invention what I claim as new and desire to secure by Letters Patent, is:—

A land leveling device comprising a pair of runners arranged in parallel, transverse scraper plates fixed to extend between said runners adjacent their ends and reaching thereabove, rails carried on the upper edges of said scraper plates to extend at the rear, a shaft journalled in the extending ends of said rails, said shaft having cranks at its ends arranged in parallel, wheels mounted rotatably on said cranks, a lever fixed on said shaft, a hand lever on the front end of one of said rails, a link connecting said levers, means for retaining said hand lever in adjustment whereby said wheels may be held in a raised or lowered position relative to said runners, and a seat carried on the front portions of said rails.

In witness whereof I have affixed my signature.

GOTTLIEB H. RUHL.